No. 867,302. PATENTED OCT. 1, 1907.
F. H. RICHARDS.
FASTENING DEVICE.
APPLICATION FILED DEC. 18, 1901. RENEWED JAN. 31, 1906.
Fig. 2.
Fig. 3.
Fig. 8.
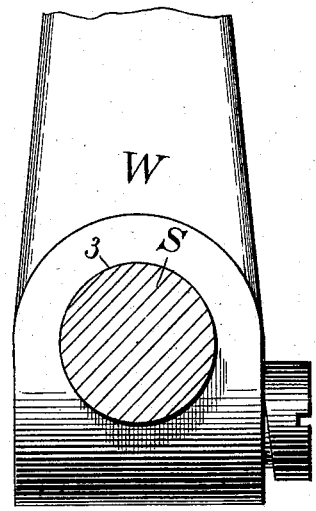
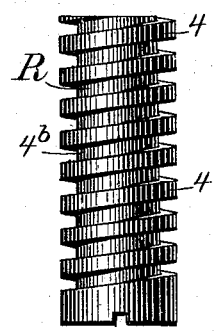
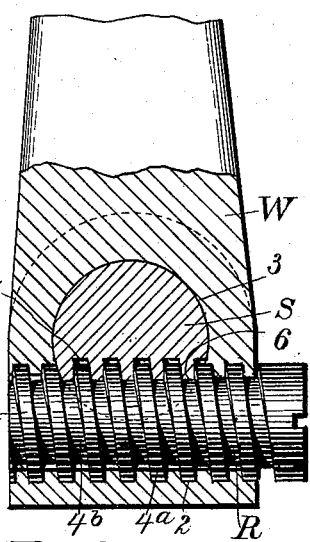
Fig. 9.
Fig. 1.
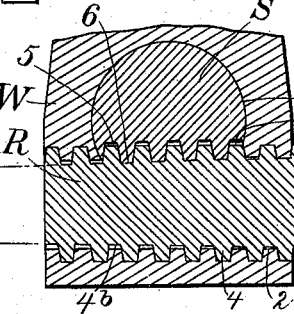
Fig. 6.
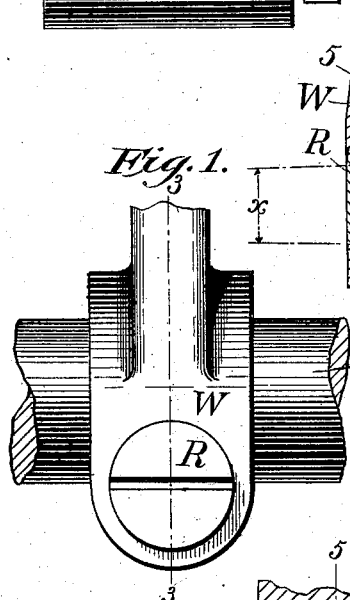
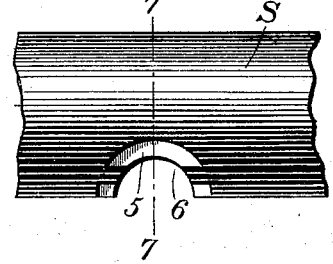
Fig. 7.
Fig. 4.
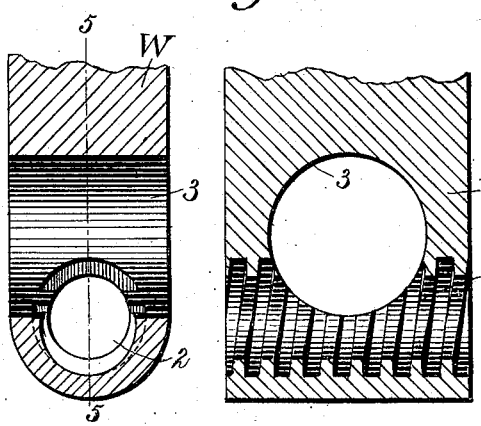
Fig. 5.
Witnesses:
H. Jacobs
R. W. Pittman
Inventor:
F. H. Richards
THE NORRIS PETERS CO., WASHINGTON, D. C.

UNITED STATES PATENT OFFICE.

FRANCIS H. RICHARDS, OF HARTFORD, CONNECTICUT.

FASTENING DEVICE.

No. 867,302.　　　　Specification of Letters Patent.　　　　Patented Oct. 1, 1907.

Application filed December 18, 1901, Serial No. 86,374. Renewed January 31, 1906. Serial No. 298,825.

*To all whom it may concern:*

Be it known that I, FRANCIS H. RICHARDS, a citizen of the United States, residing at Hartford, in the county of Hartford and State of Connecticut, have invented certain new and useful Improvements in Fastening Devices, of which the following is a specification.

This invention relates to devices for securing machine and kindred parts fixedly together and is especially directed toward the furnishing of a fastening device for use in assembling shafts and parts carried thereon in machines where precision in the relative position of the parts is desired.

It is a further object of the invention to provide a fastening device adapted to be made in very small sizes with a high degree of precision, and also at a low cost of manufacture.

This invention is closely related to the improvements in fastening devices disclosed in my applications Serial No. 37,420, filed November 23, 1900, and Serial No. 63,516 filed June 7, 1901, in which applications there are shown described and claimed devices for securing machine parts together. The inventions, as therein set forth embody a locking piece or element of peculiar form and construction, and which in the organization shown and described, is seated in an opening extending transversely to that opening in the secured member in which the shaft is located when the parts are assembled.

The present invention, like the one set forth in my applications hereinbefore referred to, provides a two part fastening device of a form and construction permitting both recessses or openings (that for the shaft and that for the locking piece) to be extended entirely across or through their respective parts, facilitating thereby the necessary machining or other treatment to fit them for their connection. The present improvement differs, however, from that disclosed in the latter of the two applications in that, while in the latter the opening for the reception of the locking piece or element is smooth and substantially cylindrical, in this case such opening is provided with thread like shoulders.

In the drawing accompanying the present specification Figure 1 illustrates the invention as applied to the securing of a crank or arm to a shaft. Fig. 2 is an end elevation of the parts shown in Fig. 1, looking along the shaft. Fig. 3 is a sectional view on the plane of the line 3—3 in Fig. 1. Fig. 4 is a longitudinal section of the crank or arm, the plane of the section being that of the axis of the opening in the arm through which the shaft is adapted to extend and this figure showing the relation of the openings in the crank or arm, one for the reception of the shaft and the other for the reception of the locking piece. Fig. 5 is a section of the arm or crank shown in the preceding figures, the plane of the section being that indicated by the lines 5—5 in Fig. 4. Fig. 6 is an elevational view of a portion of the shaft constituting one of the illustrated connected parts or members, this figure showing the shaft as removed from the arm while the recess in the shaft in which the locking piece is adapted to fit is also indicated. Fig. 7 is a cross section on the plane of the line 7—7 in Fig. 6. Fig. 8 is an elevational view of the locking piece or element shown in Fig. 3, the same being removed from its assembled position. Fig. 9 is a section corresponding to Fig. 3, the locking piece shown in elevation in the latter figure being here in section.

Similar characters of reference designate corresponding parts in all the figures.

The fastening device comprised in the present invention like those disclosed in my hereinbefore mentioned applications may be said to comprise cylindrical and conical surfaces so combined with relation to each other and to their respective contacting surfaces, that the reliability of the fastening device, considered as a whole, is independent of the particular position, within limits, in which the two parts or members are placed for the purpose of being secured, one to the other. The conical surface coöperating with its opposed surface accomplishes a wedging or binding of the parts in place, while the cylindrical surface is so disposed with relation to the other surfaces as to render an effective binding action to a considerable degree independent of the relative position of the parts, one to the other.

Entering upon a more detailed description of the embodiment of the invention illustrated, S designates a shaft and W a crank or arm secured thereto by means of he present device; these particular parts, as will be understood, however, are shown merely for illustrative purposes.

R designates a locking piece or element whose surfaces constitute in the preferred form of the invention, the above mentioned operative conical and cylindrical surfaces. These surfaces are combined in such a way upon the locking piece, that while the conical surface or surfaces coöperate with properly positioned surfaces to effect the locking of the parts, by reason of a longitudinal movement given to the locking piece, yet the re-action surface or surfaces, which receive the lateral thrust due to the slight lateral movement of the locking piece when urged longitudinally to position, is a cylindrical one. Either one or both of these surfaces, that is the conical and cylindrical surfaces, is preferably spirally disposed on the locking piece. They are here both shown as disposed in this manner. The opening, see 2, for the reception of the locking piece R extends transversely to the axis of the shaft S and preferably entirely through the crank arm or other part connected thereto as the forming of a through opening in the arm, etc., will facilitate the making of the opening. This opening is a straight opening, that is, it may be a bored and drilled opening, and furthermore, it is not material whether the locking element fits snugly therein or not. Likewise the opening 3 in the arm for the reception of the shaft S, and which it will be noted extends transversely to the axis of the opening 2 therein need not necessarily be of a diameter requisite to form a snug fit of the shaft as the purpose and effect of moving the locking piece to its final or locking position is to wedge the parts firmly together, irrespective of their looseness.

The locking piece embodying the cylindrical and conical surfaces mentioned is shown provided with a screw thread 4 on its exterior surface. The diameter of this locking piece and the coarseness or pitch of its thread or threads will be such as to insure ample strength to withstand the strain to which the parts may be subjected. The cross section of the thread may be varied from that shown, although for the satisfactory application of the invention, I deem it advisable that there should be surfaces at the top and bottom of the thread of substantial length as measured axially of the screw. The screw may also be single, double or triple, etc., threaded.

In the construction illustrated, the top surface of the thread 4 upon the locking piece constitutes a portion of the surface of a cylinder. That is, the stock in which the thread is formed is substantially cylindrical from end to end. This surface at the top of the thread constitutes the mentioned cylindrical surface designated for reference by 4$^a$. The core or the body of the locking piece, however, tapers slightly from one end to the other, the thread in this instance being deeper at the entering end of the locking piece than at the opposite end; compare the relative distances X and Y in Fig. 9. The surface of this core, that is, the surface at the bottom of the thread forms the mentioned conical surface designated for reference by 4$^b$.

It is evident from the foregoing description, that if the thread sections upon one of the parts to be connected are made of a depth not less than the maximum depth of the thread upon the locking piece, then the tops of these thread sections will contact with the conical surface or surfaces 4$^b$ at the bottom of the thread on the locking piece, and as the latter is moved inward a slight lateral movement of the piece will ensue. Hence owing to the tapering core of the locking piece the lengthwise movement of the piece will be accompanied by its slight lateral movement. These mentioned thread sections, are in the present instance formed in the part opposite the arm or crank; see the thread sections 5 formed in the surface of the concave recess 6 in the shaft S, disposed in line with the locking piece opening in the arm. The thrust arising from the lateral movement of the locking piece is in this instance taken by the opposite part, that is, the arm, and preferably the surfaces between which this thrust or pressure is exerted, are substantially cylindrical so as not to render the reliability of the fastening device dependent upon the exact position of the crank or arm, with reference to the shaft.

As above stated, the locking piece R is of substantially uniform diameter from end to end as measured across the top of the thread, and to render the top surface of this thread operative as a thrust surface, the bore of the opening 2 in the arm or crank for the locking piece, is substantially cylindrical. The thread 6 in the bore of the opening in the arm, in which the locking piece is located is not designed to coöperate with the corresponding thread upon the locking piece except in so far as shoulders are presented engaging with the side of the thread upon the latter and acting to draw the locking piece inward when inserted and rotated, since the depth of the thread in the arm, is, in the present embodiment, not greater than the minimum depth of the thread on the locking piece. It is evident therefore that the top of the thread upon the latter will contact with the surface at the bottom of the thread in the arm before the tops of this latter thread contact. Hence the operative contact, and by this expression I mean the contact to which the principle of the invention may be referred, is in the present instance on one side, cylinder to cylinder, while the other side, being wedge shaped, or inclined relatively to the former side occasions the wedging of the parts firmly together. It is not important therefore, in assembling and reassembling the parts, that they should always be located in identically the same relative position, to render the present fastening device effective as such, although by the use of this invention, the parts may be secured one to the other with great precision. This variation in position with the attendant uniformity in securing a precision of attachment is especially desirable in the securing of small machine parts together.

Having described my invention, I claim—

1. In a two-part fastening device, the combination with a locking piece, of a part having intersecting transverse openings, one for the reception of the part to be connected to the mentioned part and the other a shouldered opening with the shoulders of which the locking piece is adapted to engage, one at least of the contactual surfaces of the locking piece being inclined to the axis of said piece, while the contactual surface at the diametrically opposite side thereof is substantially parallel to said axis.

2. In a two-part fastening device, the combination with a locking piece, of a part having intersecting transverse openings, one for the reception of the part to be connected to the mentioned part and the other a shouldered opening with the shoulders of which the locking piece is adapted to engage, one at least of the contactual surfaces at the side of the locking piece being curved and inclined to the axis of said piece, while the contactual surface at the diametrically opposite side thereof is cylindrical.

3. In a two-part fastening device, the combination with a locking piece, of a part having transverse openings, one for the reception of the part to be connected to the mentioned part and the other a shouldered opening with the shoulders of which the locking piece is adapted to engage, one at least of the contactual surfaces at the side of the locking piece being inclined to the axis of the locking piece while the contactual surface at the diametrically opposite side thereof is substantially parallel to said axis and spirally arranged.

4. In a two-part fastening device, the combination with a locking piece, of a part having intersecting transverse openings, one for the reception of the part to be connected to the mentioned part and the other a shouldered opening with the shoulders of which the locking piece is adapted to engage, one at least of the contactual surfaces at the side of the locking piece being inclined to the axis of the locking piece while the contactual surface at the diametrically opposite side thereof is cylindrical, both the conical and cylindrical surfaces being spirally disposed.

5. In a two-part fastening device, the combination with a locking piece having a cylindrical contactual surface at one distance from the axis and a diametrically opposite conical contactual surface at a less distance therefrom, of a part having intersecting transverse openings, one for the reception of the part to be connected to the mentioned part, and the other opening being provided with shoulders adapted to engage with the locking piece.

6. In a two-part fastening device, the combination with a locking piece having a cylindrical contactual surface located at one distance from its axis and a diametrically opposite conical contactual surface at another distance therefrom, and both of which surfaces are spirally arranged, of a part having intersecting transverse openings, one for the reception of the part to be connected to the mentioned part and the other opening being provided with shoulders adapted to engage with the locking piece.

7. In a two-part fastening device, the combination with a locking piece having a cylindrical contactual surface located at one distance from its axis and a diametrically opposite conical contactual surface at a less distance therefrom, and both of which surfaces are spirally arranged, of a part having intersecting transverse openings, one for the reception of the part to be connected to the mentioned part, and the other opening being provided with shoulders adapted to engage with the locking piece.

8. In a two-part fastening device, the combination with a locking piece, of a part having intersecting transverse openings, one of which openings has a smooth bore and is adapted to receive the part to be connected to the mentioned part and the other opening being provided with shoulders adapted to engage with the locking piece, one at least of the contactual surfaces at the side of the locking piece being inclined to the axis thereof while the contactual surface at the diametrically opposite side thereof is parallel to said axis.

9. In a two-part fastening device, the combination with a locking device having diametrically opposite cylindrical and conical contactual surfaces, both spirally disposed, of a part having intersecting transverse openings, one for the reception of the part to be connected to the mentioned part and the other for the reception of the locking piece, this latter opening having an operative surface spirally disposed.

10. In a two-part fastening device, the combination with a locking piece having diametrically opposite conical and cylindrical contactual surfaces at different distances from the axis of the piece, of a part having intersecting transverse openings, one of the openings having a smooth bore and being adapted to receive the part to be connected to the mentioned part and the other of the openings having an operative surface spirally disposed and being adapted to receive the locking piece.

11. In a two-part fastening device, the combination with a screw-like locking piece having a greater depth of thread at the entering end of the screw than at the other end, of a part having intersecting transverse openings, one for the reception of the part to be connected to the mentioned part, and the other opening having an operative surface spirally disposed and adapted to engage with the locking piece.

12. In a two-part fastening device, the combination with a screw-like locking piece having a greater depth of thread at the entering end of the screw than at the other end, of a part having intersecting transverse openings, one opening having a smooth bore and being adapted to receive the part to be connected to the mentioned part and the other opening having an operative surface spirally disposed and adapted to engage with the locking piece.

13. In a two-part fastening device, the combination with a screw-like locking piece having a greater depth of thread at the entering end of the screw than at the other end, of a part having intersecting transverse openings, one opening having a smooth bore and being adapted to receive the part to be connected to the mentioned part, and the other opening having a thread of a depth not greater than the minimum depth of the thread upon the locking piece and being adapted to receive said locking piece, and a part connected to the said first mentioned part, said connected part having thread sections of a depth not less than the maximum depth of the thread on the locking piece.

14. In a fastening device the combination with a screw-like locking piece having a greater depth of thread at the entering end of the screw than at the other end, of a part having intersecting transverse openings, one for the reception of the part to be connected to the mentioned part and the other opening having a thread of a depth not greater than the minimum depth of the thread on the locking piece and which is adapted to engage with the thread on said locking piece, the connected part having thread sections constituting a continuation of the thread within the opening in which the locking piece is located and the depth of which thread sections are not substantially less than the maximum depth of the thread on the locking piece.

15. In a two-part fastening device, the combination with a locking piece having a conical core and a spirally disposed thread, the perimeter of the spiral being cylindrical throughout, of a part having intersecting transverse openings, one of these for receiving the part to be coupled to the mentioned part and the other being cylindrical and provided with a spirally disposed thread not greater than the minimum depth of the thread upon the locking piece, and a part occupying the first of said openings and having a thread of a depth not less than the maximum depth of the thread on the locking piece.

FRANCIS H. RICHARDS.

Witnesses:
 FRED. J. DOLE,
 JOHN O. SEIFERT.